US010997170B2

(12) United States Patent
Ju et al.

(10) Patent No.: US 10,997,170 B2
(45) Date of Patent: May 4, 2021

(54) LOCAL DATABASE CACHE

(71) Applicants: Hewlett Packard Enterprise Development LP, Houston, TX (US); Jing-Hao Ju, Shanghai (CN); Bo Wang, Shanghai (CN); Bin Wu, Shanghai (CN)

(72) Inventors: Jing-Hao Ju, Shanghai (CN); Bo Wang, Shanghai (CN); Bin Wu, Shanghai (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 657 days.

(21) Appl. No.: 15/307,935

(22) PCT Filed: Aug. 7, 2014

(86) PCT No.: PCT/CN2014/083898
§ 371 (c)(1),
(2) Date: Oct. 31, 2016

(87) PCT Pub. No.: WO2016/011677
PCT Pub. Date: Jan. 28, 2016

(65) Prior Publication Data
US 2017/0068703 A1 Mar. 9, 2017

Related U.S. Application Data

(60) Provisional application No. 62/029,407, filed on Jul. 25, 2014.

(51) Int. Cl.
*G06F 16/00* (2019.01)
*G06F 16/2453* (2019.01)
(Continued)

(52) U.S. Cl.
CPC .... *G06F 16/24542* (2019.01); *G06F 12/0893* (2013.01); *G06F 16/248* (2019.01);
(Continued)

(58) Field of Classification Search
CPC ..................... G06F 17/30463; G06F 17/24542
(Continued)

(56) References Cited

U.S. PATENT DOCUMENTS

2007/0226196 A1* 9/2007 Adya ................ G06F 16/24539
2008/0189311 A1* 8/2008 Cote ..................... G06F 16/217
(Continued)

FOREIGN PATENT DOCUMENTS

| CN | 101169790 A | 4/2008 |
|---|---|---|
| CN | 101290625 A | 10/2008 |

(Continued)

OTHER PUBLICATIONS

International Searching Authority, "PCT International Search Report", PCT/CN2014/083898, dated Aug. 7, 2014, 7 pages.
(Continued)

*Primary Examiner* — Chelcie L Daye
(74) *Attorney, Agent, or Firm* — Hewlett Packard Enterprise Patent Department

(57) ABSTRACT

A stored procedure call may be transmitted to a database to execute a database query. As a result of the stored procedure call, results including a result record satisfying the database query and a set of records related to the result record may be received. The results may be stored in a local cache.

19 Claims, 5 Drawing Sheets

(51) Int. Cl.
   *G06F 16/248* (2019.01)
   *G06F 16/2455* (2019.01)
   *G06F 12/0893* (2016.01)
(52) U.S. Cl.
   CPC .. *G06F 16/24539* (2019.01); *G06F 16/24552* (2019.01); *G06F 2212/1021* (2013.01); *G06F 2212/1024* (2013.01); *G06F 2212/465* (2013.01)
(58) Field of Classification Search
   USPC ........................................................ 707/718
   See application file for complete search history.

(56) References Cited

U.S. PATENT DOCUMENTS

| 2009/0254601 | A1* | 10/2009 | Moeller | G06F 9/542 709/201 |
| 2014/0156806 | A1 | 6/2014 | Karpistsenko et al. | |
| 2015/0066975 | A1* | 3/2015 | Dos Santos | G06F 16/245 707/769 |

FOREIGN PATENT DOCUMENTS

| CN | 102541927 A | 7/2012 |
| WO | WO-2013096894 | 6/2013 |

OTHER PUBLICATIONS

North, K., "Sharding, Replication, Caches, and In-memory Databases", Dr. Dobb's Bloggers (Web Page), Jun. 30, 2011, 4 pages.

Stopford, B., "Beyond the Data Grid: Coherence, Normalisation, Joins and Linear Scalability", ODC (Research Paper), Mar. 9, 2011, 60 pages.

Unknown, "A High Performance, Scalable RDBMS for Big Data", VoltDB The NewSQL database for high velocity applications (Research Paper), Apr. 11, 2012, 17 pages.

Unknown, NoRAM DB => "If It Does Not Fit in RAM, I Will Quietly Die For You", kam one of those blogs (Web Page), Jul. 6, 2011, 5 pages.

HPE, "Enhanced Internet Usage Manager", available online at <http://web.archive.org/web/20140419022919/http://www8.hp.com/us/en/industries/communications-media-entertainment.html?compURI=1316603> Apr. 19, 2014, 2 pages.

Memcached, "Memcached—a Distributed Memory Object Caching System", available online at <http://www.memcached.org/>, 2009, 2 pages.

Oracle, "Oracle TimesTen In-Memory Database", available online at <https://www.oracle.com/database/technologies/related/timesten.html>, retrieved on Dec. 9, 2020, 5 pages.

VOLTDB, "VOLTDB", available online at <https://www.voltdb.com/>, retrieved on Dec. 9, 2020, 4 pages.

* cited by examiner

LOCAL DATABASE CACHE

BACKGROUND

Database management systems (DBMSs) are specially designed software applications that interact with the user, other applications, and the database itself to capture and analyze data. A relational database management system (RDBMS) is a DBMS that is based on the relational database model. Some relational database systems allow the use of stored procedures. A stored procedure is a subroutine available to applications that access a relational database system.

BRIEF DESCRIPTION OF THE DRAWINGS

Certain examples are described in the following detailed description and in reference to the drawings, in which.

DETAILED DESCRIPTION OF SPECIFIC EXAMPLES

In a traditional database access environment, a query is sent to a database and a result to the query is returned by the database. Accordingly, each query results in a network round trip. Some applications may execute many queries rapidly, resulting in many network round trips. The latency resulting from these trips may be detrimental, particularly in real-time applications. A common solution for high velocity data processing is to augment the RDBMS with a key/value cache. However, use of key value caches may require application to do their own data partitioning, which can be complex and undesired.

Additionally, some database products are not suitable for application teams to work with directly. For example, some databases with shared-nothing scale-out architecture with transparent data partitioning provide optimizations requiring all transactions to be conducted as stored procedures. In particular, some emerging in-memory databases, with partitioned shared-nothing scale-out architecture, require stored procedures to provide optimizations data access with low latency and high throughput. In some cases, this provides many benefits, such as high transaction per second, low latency, easy scaling, and avoidance of data loss. When many applications may access a database or many types of queries with varying parameters may be performed on a database, requiring application developers to write data access logic into several stored procedures in advance can be undesirable.

Aspects of the disclosed technology provide a data access tier over a database. The data access tier may provide object relational mapping to map ad hoc object queries to stored procedure calls, avoiding the requirement for application designers to implement procedure calls directly. Additionally, the data access tier may provide a local cache that stores database records resulting from the object queries, as well as a tree of objects associated by foreign keys. This may reduce latency and decrease access time by pre-loading records in memory that are likely to be requested in future queries. Additionally, aspects of the disclosed technology combine the results of many database operations into one transaction, allowing a combination of data access operations to be performed in a single database transaction through a stored procedure call.

Figure 1:
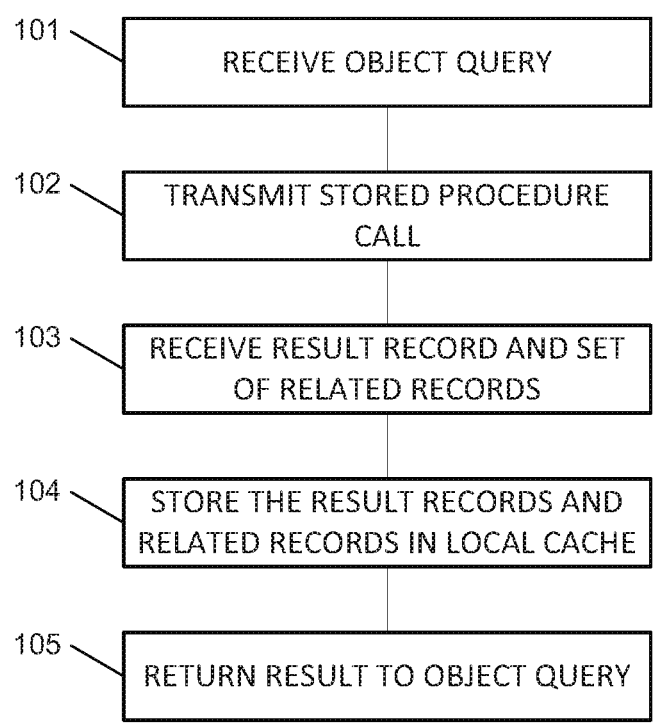
FIG. 1 illustrates an example method for providing a local database cache.

FIG. 1 illustrates an example method for providing a local database cache. In some cases, the method may be performed by a database client providing database access to an application. For example, the method may be performed to provide access to a subscriber database for an internet usage manager. The subscriber database may store information for a communication service provider's subscribers and the internet usage manager may provide a platform for real time charging and mediation The example method includes block 101. Block 101 may include receiving an object query. In some cases, the object query may be received from an application, such as an internet usage management application or other telecommunications application. For example, the object query may be an application call requesting information by an application associated with a particular domain data model used by the application. For example, in an internet usage management platform, the object may be a subscriber-related object or a device-related object. In some cases, the objects may be documents, such as an Extensible Markup Language (XML) document, and the object query may be a request for a particular document matching object query parameters.

The example method further includes block 102. Block 102 may include transmitting a stored procedure call to a database to execute a database query. The stored procedure call may correspond to the object query based on an object-relational mapping (ORM) model. The ORM model may determine which database fields or columns from database records are contained in the object along with their format. The stored procedure call may cause the database to execute a cascaded loading stored procedure.

The cascaded loading stored procedure may be executed by the database to return a result record that satisfies the database query and a set of records related to the result record. In some implementations, the stored procedure may instruct the database to return the result record and a record identified by a foreign key contained in the result record. In further implementations, the stored procedure may instruct the database to return the result record, the record identified by the foreign key, and any other record containing the foreign key. In still further implementations, the stored procedure may instruct the database to return the result record, the record identified by the foreign key, and any record referencing the record identified by the foreign key. In some cases, the related records may be from the same database table as the result record. In further cases, the related records may be from the same database table and other database tables. In some implementations, the other database tables may any other database stored in the database or a predefined subset of the available tables.

In some cases, the field containing the foreign key may be predefined when the stored procedure is generated. In other cases, the field for the foreign key may be included as a parameter in the stored procedure call. In some cases, the database may perform a tree search using the foreign key starting with result record. Once the root of the tree is requested, the database may recursively search down the tree to determine all records related by the foreign key. For example, the query may be for a record identified by a device identification number (ID). The stored procedure call may return the record and any record related to the record by a subscriber ID. A subscriber may own multiple devices, and executing such a stored procedure call may return all records owned by the subscriber. Additionally, the stored procedure call may return other records associated with the subscriber from other tables in the database.

The example method further includes block 103. Block 103 may include receiving a result of the stored procedure call. The result may include a result record satisfying the database query and a set of records related to the result record. As described above, the set of records may be related to the result record by a foreign key contained in the result record. For example, the set of records may include a record identified by a foreign key in the result record or another record including the foreign key. Further, the set of records may include any record referencing the record identified by the foreign key. In some cases, the related records may be from the same database table as the result record. As described above, the related records may be from the same database table and other database tables.

The example method further includes block 104. Block 104 may include storing the result record and the set of records in a local cache. The local cache is stored directly in memory.

In some implementations, the local cache may comprise a query cache using the foreign key for each record. The local cache may be used to satisfy object queries related to the object query received in block 101. Accordingly, a series of related queries may be executed by the application with reduced latency compared to access the database for each query. In further implementation, block 104 may comprise using the ORM model to generate a set of related objects. The related objects may then be stored in a cache where each object is associated with the foreign key for each object.

The example method further includes block 105. Block 105 may include returning a result to the object query based on the result record. For example, block 105 may include generating the result using the result record and the ORM model used to generate the database query from the object query.

Figure 2:
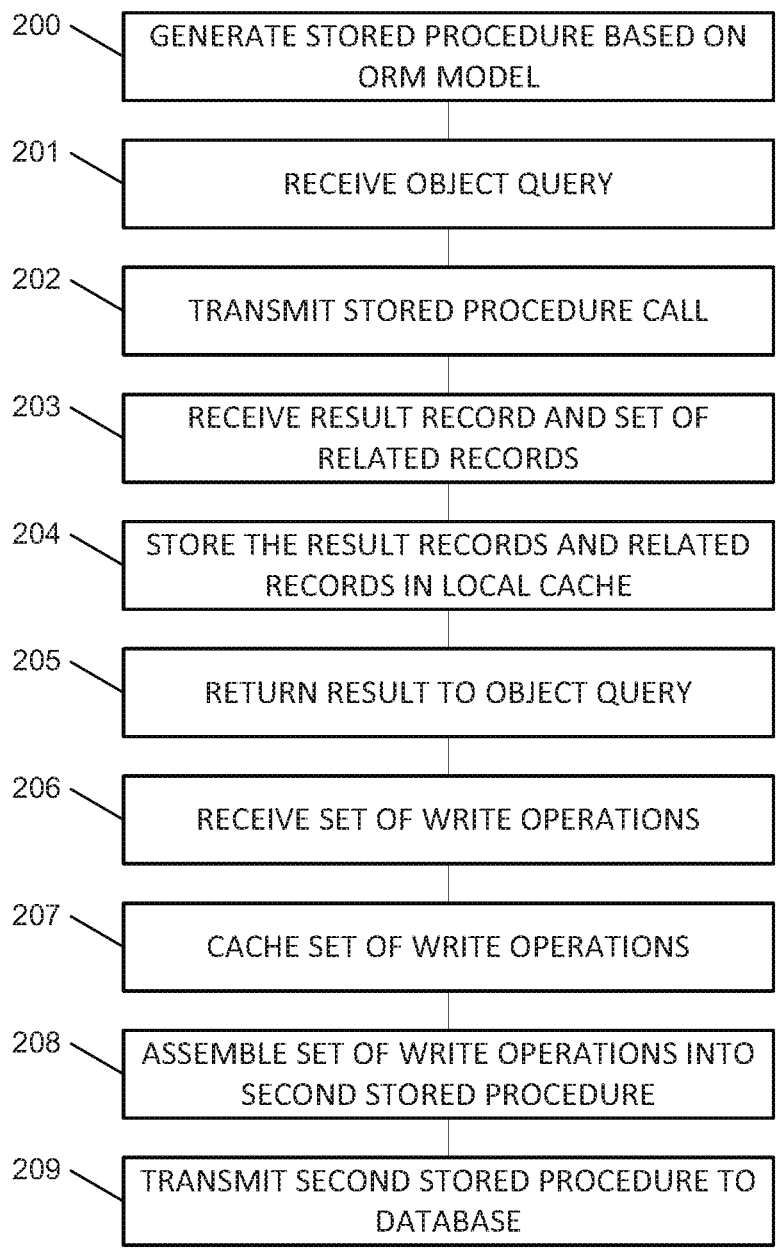
FIG. 2 illustrates an example method for providing a local database cache and performing a batch commit operation on a database.

FIG. 2 illustrates an example method for providing a local cache and performing a batch commit operation on a database. In some cases, the method may be performed by a database client providing database access to an application. For example, the method may be performed to provide access to a subscriber database for an interact usage manager. The subscriber database may store information for a communication service provider's subscribers and the internet usage manager may provide a platform for real time charging and mediation.

The example method may include block 200. Block 200 generating the stored procedure automatically based on an ORM model. For example, the ORM model may be a model used to translate objects used by the application to records stored in the database. In some implementations, block 200 may include generating the stored procedure automatically during the database design time. For example, a query used by the application may be predefined prior to design time. At design time, the query and the ORM model may be used to automatically generate the stored procedure. The automatically generated stored procedure may then be programmed into the database. In some cases, block 200 may include generating a separate stored procedure for each query that the application may provide during operation.

In some implementations, block 200 may further include automatically generating Data Definition Language (DDL) schema files associated with the stored procedure. For example, block 200 may include generating the stored procedures and DDL schema files automatically based on the applications domain data models and corresponding ORM configurations. The generated stored procedures may include basic create, read, update, delete (CRUD) procedures, cascaded loading procedures, batch commit procedures, procedures with customized SQL statements, and other database procedures.

The example method further includes blocks 201-205. Blocks 201-205 may be performed as described with respect to blocks 101-105 of FIG. 1, respectively.

The example method further includes block 206. Block 206 may include receiving a set or write operations. For example, the write operations may be object operations performed by the application. These write operations may be translated into database operations using the ORM model for the application. For example, the write operations may be operations executed by the application to update the database. In some implementations block 206 may include receiving the set of write operations by monitoring transactions occurring in the local cache.

The example method further includes block 207. Block 207 may include caching the set of write operations. For example, block 207 may comprise caching database operations during a session.

The example method further includes block 208. Block 208 may include assembling the set of write operations to into a second stored procedure call. The second stored procedure call may be a call to a stored procedure having a generic definition. For example, the generic definition may allow any data to update in a data table to input as parameters. This may allow a generic stored procedure to be able to be used for multiple application object operations. In further cases, the cached set of write operations may be assembled into multiple stored procedure calls, for example, by partition criteria. For example, different procedure calls may operate on different database tables. Aspects of the write operations that result in a change to one of the partitions may be assembled into one of the procedure calls, while aspects resulting in a change to another of the partitions may be assembled into another of the procedure calls. The example method further includes block 209. Block 209 may include transmitting the second stored procedure call to the database.

Figure 3:
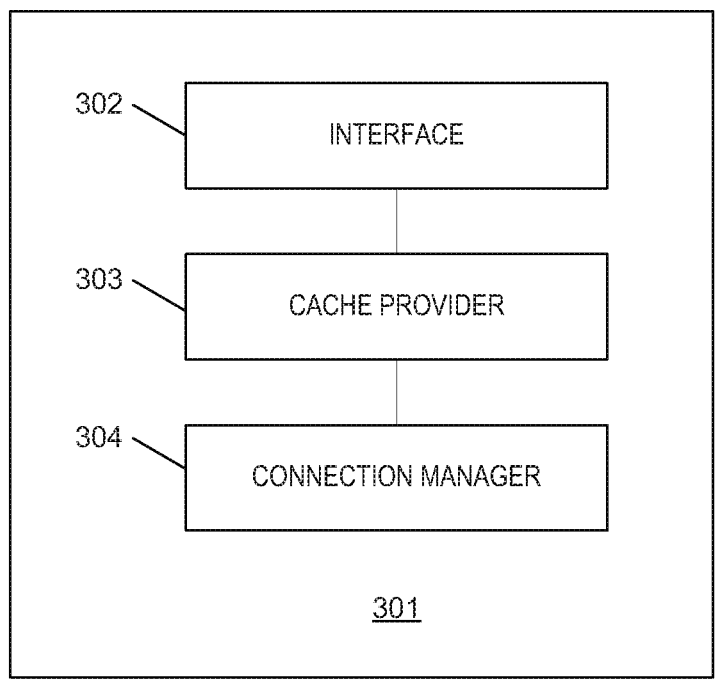
FIG. 3 illustrates an example system including a cache provider to provide a cached table.

FIG. 3 illustrates an example system including a cache provider to provide a cached table. For example, the illustrated system may execute an application that communicates with a database and may provide the illustrated modules to allow the application to interface with the database. In some implementations, the illustrated modules may be software stored on a non-transitory computer readable medium and executed by a processor, hardware modules, or a combination thereof.

The example system 301 includes an interface 302 to receive an object query and provide a result to the object query. The interface 302 may further execute an object-relational mapping to map the object query to a database query. For example, the interface 302 may perform block 101 and 104 of FIG. 1. In further implementations, the interface 302 may provide a bridge between an application and a database and local cache. For example, the interface may define a common cache application programing interface (API), for example as a Java interface. The interface 302 may provide various operations to applications, such as get, insert, update, delete, query, and cascaded loading.

The example system 301 further includes a connection manager 304. The connection manager 304 may execute a database transaction to receive a set of records including a result record satisfying the database query and a record related to the result record. For example, the connection manager 304 may perform blocks 102 and 103 of FIG. 1. As described above, in some cases, the set of records includes a record identified by a foreign key in the result record or another record including the foreign key. In further cases, the set of records includes the record identified by the foreign key and any record referencing the record identified by the foreign key.

In further implementations, the connection manager 304 may provide a tier between the system 301 and a database, such as a database cluster. It may create and maintain one or more connection to a database server, route transactions to the correct server by partition. The connection manager 304 may also conduct various housekeeping operations such as handling failover of connections. In additional implementations, the connection manager 304 may provide extensions to allow application developers or operators to monitor statistics about system components. For example, the connection manager 304 may provide a Java managed bean (MBean) to allow monitoring of cache provider 303 and database server statistics.

The example system 301 further includes a cache provider 303. The cache provider 303 may provide a local database cache table storing a subset of the set of records that were stored in a single table in the database. For example, the cache provider 303 may perform aspects of block 104 of FIG. 1.

Figure 4:
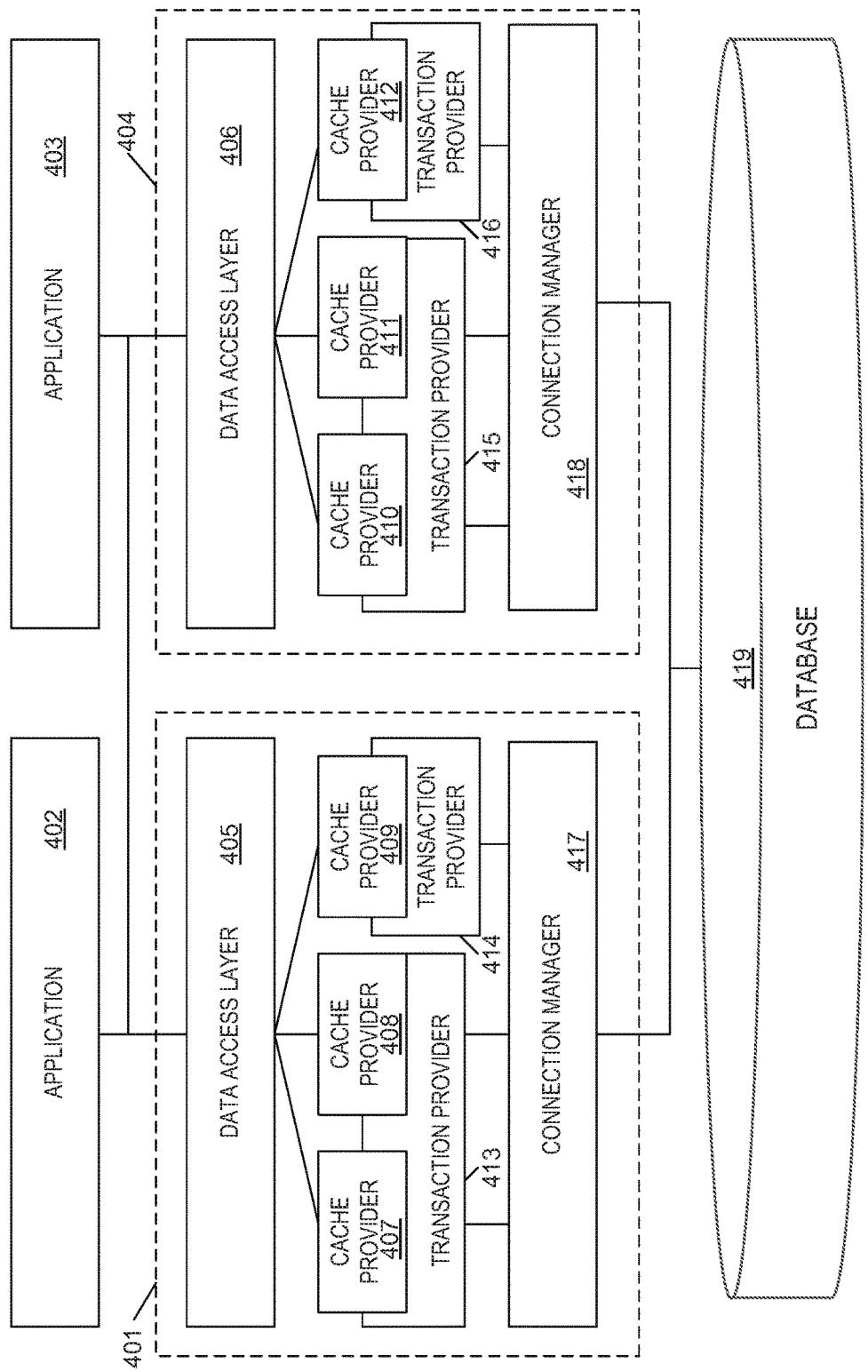
FIG. 4 illustrates example systems including sets of cache providers and sets of transaction providers.

FIG. 4 illustrates example systems 401, 404 including sets of cache providers and sets of transaction providers. For example, the systems 401, 404 may be implementations of an example system as described with respect to FIG. 3. The system may include one or more applications 402, 403 communicating with one or more local cache systems 401, 404. For example, a server may execute an application 402 and a cache system 401 and may be in communication with another server executing an application 403 and a cache system 404.

The cache systems 401, 404 may include data access layers 405, 406. For example, the data access layers 405, 406 may be implementations of the interface 302 described with respect to FIG. 3. As described above, the data access layers 405, 406 may provide bridges between the applications 402, 403 and the cache systems 401, 404. For example, they may provide a common cache API for the applications 402, 403 and provide operations such as get, insert, update, delete, query, or cascaded loading. The data access layers 405, 406 may represent the cache managed by the systems 401, 404. For example, the applications 402, 403 may access the information through an object perspective and the data access layers 405, 406 may use ORM models to present the stored information as objects.

Each cache system 401, 404 may further comprise a set of one or more cache providers 407-409, 410-412. Each cache provider 407-412 may be implemented as described with respect to cache provider 303 of FIG. 3. Groups of the cache providers 407-409 may correspond to different cascaded loading groups. A single cascaded loading stored procedure executed by system 401 performing the method of FIG. 1 may return results from multiple database tables of the database 419. Results from each of the multiple tables may be stored in a separate cache provider 407, 408, 409. For example, a first cascaded loading stored procedure may return results from two database tables, which are stored in cache providers 407, 408. A second cascaded loading procedure, corresponding to a different type of application query, may return results from a single database table, stored in cache provider 409.

In some implementations, each cache provider instance 407-412 may be generated in runtime according to a specified domain data model and corresponding ORM configuration. In these implementations, the cache providers 407-412 may act as data access objects (DAOs) for the database 419.

The systems 401 or 404 may further include transaction providers 413, 414 or 415, 416. Each transaction provider is associated with one or more cache providers 407-412. Each transaction provider may monitor to monitor transactions executed on a set of cached tables, assemble writing operations from the transactions into a batch, and transmit the batch to the database. In some cases, the transaction providers may perform blocks 206-209 of FIG. 2. For example, transaction provider 413 may monitor operations performed on cache providers 407, 408, assemble the operations into a batch and transmit the batch to the database as a batch commit operation. Each transaction provider may provide further database management functionality related to its associated cache providers. For example, the transaction provider may be in charge of database transaction management, and provide operations such as begin, commit, and rollback.

The systems 401, 404 may further include connection managers 417, 418. In some cases, the connection managers may be implemented as described with respect to connection manager 304. For example, the connection manager may provide a connection to a database 419, such as a database cluster.

Figure 5:
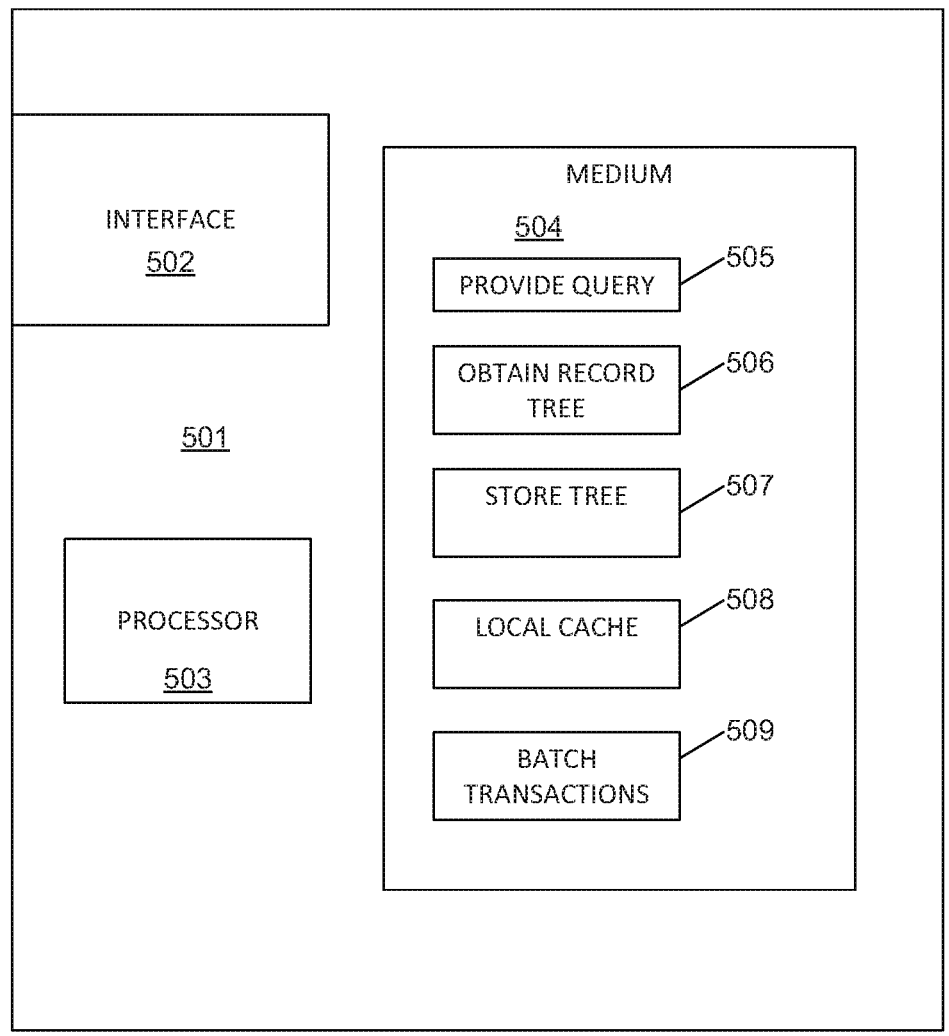
FIG. 5 illustrates a computer including a non-transitory computer readable medium storing instructions to provide a local database cache.

FIG. 5 illustrates a computer 501 including a non-transitory computer readable medium 504 storing instructions to provide a local database cache. For example, the computer 501 may be an implementation of a system illustrated in FIG. 3 or 4. In some implementations, the medium 504 may be memory, storage, or a combination thereof.

The medium 504 may store instruction set 505. The instruction set 505 may be executable by a processor 503 to provide a query to a database. For example, the query may be provided to the database over an interface 502. In some implementations, the query may relate to an object query provided by an application executed by the processor 503. For example, the application may be also stored as instructions on medium 504. For example, the instruction set 505 may be executed to perform block 102 of FIG. 1 to transmit a cascaded loading stored procedure call to a database.

The medium 504 may further store instruction set 506. Instruction set 506 may be executable by the processor 503 to obtain a tree of database records from the database, the tree including a result to the query and records related to the result by a foreign key. For example, the tree of records may include a record identified by the foreign key and any record referencing the record identified by the foreign key.

The medium 504 may further store instruction set 507. Instruction set 507 may be executable by the processor 503 to store the tree in a local cache 508. For example, the local cache 508 may be an in-memory distributed cache. In some cases, instruction set 507 may be executed to implement one or more cache providers to maintain the local cache 508. For example, the cache providers may be implemented as described with respect to FIG. 4.

In some implementations, the medium 504 may further store instruction set 509. Instruction set 509 may be executable by the processor 503 to monitor transactions executed on the set of cached tables, assemble writing operations from the transactions into a batch, and transmit the batch to the database. For example, the instructions 509 may be executable to perform blocks 206-209 of FIG. 2 or to implement one or more transaction providers as described with respect to FIG. 4.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
receiving an object query;
transmitting a stored procedure call to a database, wherein:
the stored procedure executes a database query corresponding to the object query,
the database query is based on an object-relational mapping (ORM) model,
the stored procedure instructs the database to return a result record and a record identified by a foreign key contained in the result record, and
the foreign key is predefined when the stored procedure is generated as a parameter in a call layout of the stored procedure;
receiving, as a result of the stored procedure call, the result record satisfying the database query and a set of records related to the result record, wherein a first key of the result record matches the foreign key in the stored procedure, and wherein a second key of at least one of the set of records related to the result record also matches the foreign key;
storing the result record and the set of records in a local cache; and
returning a result to the object query based on the result record, wherein the related record is from the same database table as the result record.

2. The method of claim 1, further comprising:
generating the stored procedure automatically based on the ORM model at design time.

3. The method of claim 1, wherein the set of records related to the result record includes a record identified by the foreign key in the result record or another record including the foreign key.

4. The method of claim 3, wherein the set of records related to the result record includes the record identified by the foreign key and any record referencing the record identified by the foreign key.

5. The method of claim 1, further comprising:
receiving a set of write operations;
caching the set of write operations;
assembling the set of write operations to into a second stored procedure call; and
transmitting the second stored procedure call to the database.

6. The method of claim 1, further comprising: storing the local cache as a relational database.

7. A system comprising:
an interface implemented with instructions stored on a non-transitory computer readable medium to:
receive an object query,
provide a result to the object query, and
execute a stored procedure that executes a database query based on an object-relational mapping (ORM) to map the object query to the database query,
the stored procedure instructing a database to return a result record and a record identified by a foreign key contained in the result record, and
the foreign key is predefined when the stored procedure is generated as a parameter in a call layout of the stored procedure;
a connection manager implemented with the instructions stored on the non-transitory computer readable medium to:
receive a set of records including a result record satisfying the database query and a record related to the result record, the related record being from the same database table as the result record, a first key of the result record matching the foreign key in the stored procedure, and a second key of at least one of the set of records related to the result record also matching the foreign key; and
a cache provider implemented with the instructions stored on the non-transitory computer readable medium to:
provide a local database cache table storing a subset of the set of records that were stored in a single table in the database, the subset including the record related to the result record.

8. The system of claim 7, wherein the set of records includes a record identified by the foreign key in the result record or another record including the foreign key.

9. The system of claim 8, wherein the set of records includes the record identified by the foreign key and any record referencing the record identified by the foreign key.

10. The system of claim 7, further comprising:
a set of cache providers, each cache provider to provide a separate cached table storing a separate subset of the set of records that were stored in a separate table in the database.

11. The system of claim 10, further comprising:
a transaction provider to monitor transactions executed on the set of cached tables, assemble writing operations from the transactions into a batch, and transmit the batch to the database.

12. The system of claim 11, wherein the transaction provider is to transmit the batch to the database as a stored procedure call.

13. A non-transitory computer readable medium storing instructions executable to:
receive an object query;
transmit a stored procedure call to a database, wherein:
the stored procedure executes a database query corresponding to the object query,
the database query is based on an object-relational mapping (ORM) model,
the stored procedure instructs the database to return a result record and a record identified by a foreign key contained in the result record; and
the foreign key is predefined when the stored procedure is generated as a parameter in a call layout of the stored procedure;
receive, as a result of the stored procedure call, the result record satisfying the database query and a set of records related to the result record, wherein a first key of the result record matches the foreign key in the stored procedure, and wherein a second key of at least one of the set of records related to the result record also matches the foreign key;

store the result record and the set of records in a local cache: and return a result to the object query based on the result record, wherein the related record is from the same database table as the result record.

14. The non-transitory computer readable medium of claim 13, wherein a tree of records includes a record identified by the foreign key and any record referencing the record identified by the foreign key.

15. The non-transitory computer readable medium of claim 13, storing further instructions executable to:

monitor transactions executed on a set of cached tables, assemble writing operations from the transactions into a batch, and transmit the batch to the database.

16. The method of claim 1, wherein the local cache comprises a query cache that stores the result record using the foreign key for each record.

17. The method of claim 1, further comprising:

automatically generating a Data Definition Language (DDL) schema file associated with the stored procedure.

18. The method of claim 1, wherein the database corresponds with a tree layout and stored procedure call transmitted to the database is a cascaded loading stored procedure call.

19. The method of claim 18, wherein the result record and the set of records related to the result record correspond with the tree layout stored in an in-memory distributed cache.

* * * * *